_United States Patent_ [19]

Hutzenlaub et al.

[11] 3,765,616

[45] Oct. 16, 1973

[54] STRIP SPACING APPARATUS
[75] Inventors: Armin S. P. Hutzenlaub, Gassenhagen; Paul-Gerhard Dürhager, Numbrecht, both of Germany
[73] Assignee: Intra-Roto, Inc., Richmond, Va.
[22] Filed: Feb. 18, 1971
[21] Appl. No.: 116,543

[30] Foreign Application Priority Data
Feb. 19, 1970 Germany.................. P 20 07 569.8

[52] U.S. Cl..................... 242/56.5, 242/76, 226/199
[51] Int. Cl........................................... B65h 35/02
[58] Field of Search................ 242/56.4, 56.5, 75.3, 242/75.51, 76, 78.1, 56; 226/152, 183, 199, 109, 197

[56] References Cited
UNITED STATES PATENTS
2,670,906   3/1954   Daniels et al.................... 242/75.51
3,463,377   8/1969   Lucas............................. 226/199 X _Primary Examiner_—George F. Mautz
_Assistant Examiner_—John M. Jillions
_Attorney_—Imirie and Smiley

[57] ABSTRACT

The apparatus laterally spaces a plurality of strips which have been slit from a relatively wide web to enable individual rewinding of the strips in spaced rolls to prevent interleaving of the convolutions of the strips in the rewind rolls. It comprises lead-in and lead-out rollers with a pair of guides disposed between said rollers, said guides being arcuate transversely of the plurality of strips. The arcuate guides serve to twist the strips from coplanar relatonship to deviate their paths from each other and then twist them back into coplanar but spaced relationship. The guides are angularly adjustable to arrange the arcs in predetermined relationship with respect to each other and to the lead-in and lead-out rollers respectively, and also are supported by pivotally mounted arms or frames to adjust the degree of arc to which the strips are subject.

10 Claims, 5 Drawing Figures

INVENTORS
ARMIN S.P. HUTZENLAUB
PAUL-GERHARD DÜRHAGER

BY Irvine & Smiley
ATTORNEYS

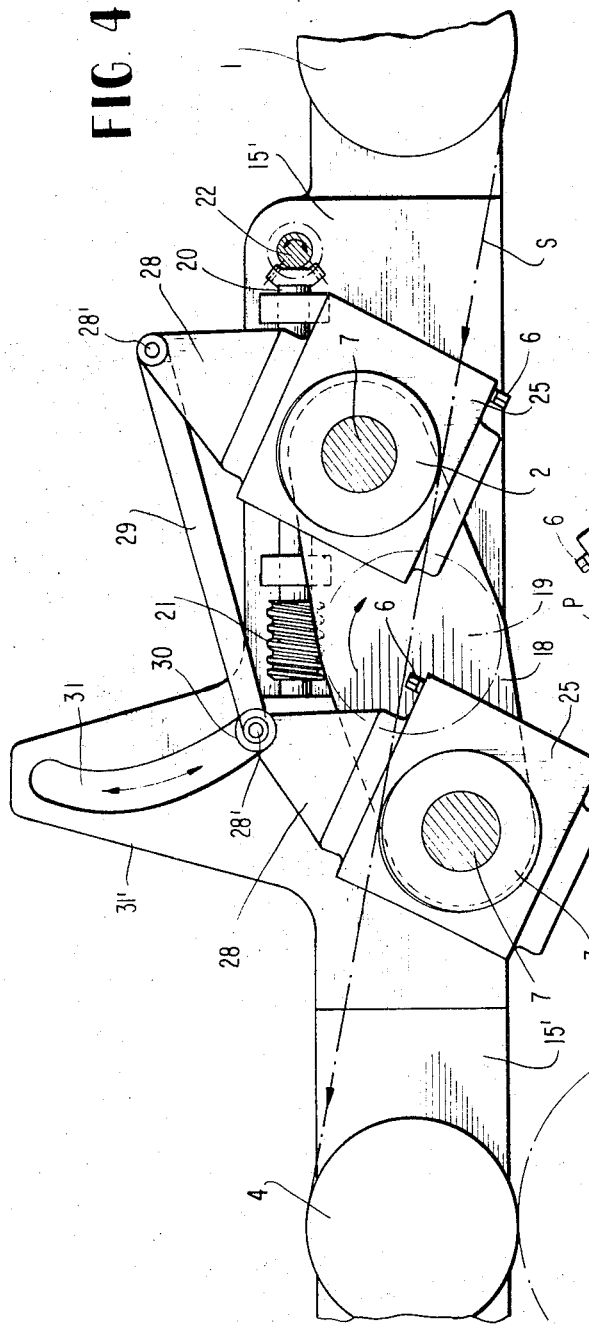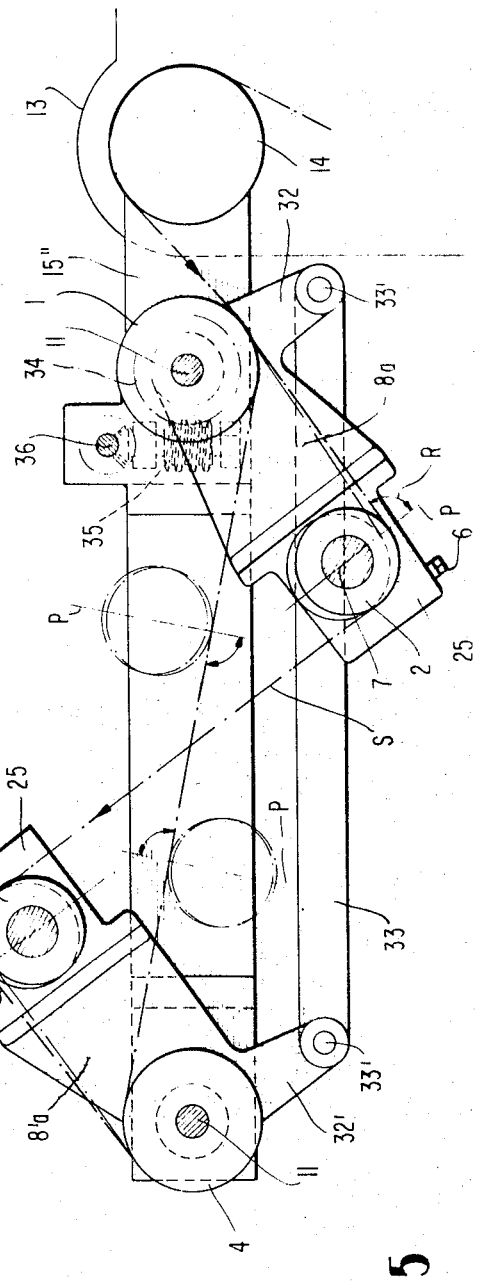

STRIP SPACING APPARATUS

BACKGROUND OF THE INVENTION

In the presently known apparatus for laterally spacing strips that have been slit side-by-side from a relatively wide web, the arcuate guides are adjustably, but fixedly mounted to establish the necessary relationship with respect to each other and to the respective lead-in and lead-out rolls. If it is desired to change the angle of the arcuate guides about their axes, or to change the arc of the guides, it is necessary to individually adjust each of the guides and/or replace the guides with guides of a different arc. The guides may constitute rigid bars or the like around which the strips pass, but fixed bars are undesirable due to the frictional resistance to the strips and also the tendency to create undesirable static electricity within the bars and/or the strips. Alternatively, the guides may be in the form of bowed rollers which comprise a sleeve of flexible material disposed around a rigid shaft and filled with a mass of anti-friction particulate material similar to ball bearings. The flexibility of the sleeve enables molding the contour of the sleeves longitudinally of the shaft by displacing the enclosed particulate material and the material enables rotation of the sleeves by engagement with the strips, thus eliminating friction. With either type of guide, there is considerable adjustment and/or replacement necessary in the event that it is desired to vary the spaced relation of the strips.

SUMMARY OF THE INVENTION

According to the present invention, the guides, whether rigid or moldable, such as the bowed rollers, are mounted on frame means which itself is pivotally mounted so that the guides may be swung through arcs to vary the angle of contact between the strips and the arcuate portions of the guides and thereby regulate the degree to which the strips are deviated from each other, and therefore, the spacing of the strips as they are fed by the lead-out roller to the rewind roll. The arrangement is such that the guides pass through exact corresponding arcs when the frame means is pivoted to vary the engagement of the guides with the strips and the angular relationship of the guides relative to each other and to the respective rollers is maintained regardless of the displacement of the guides by the frame means. Thus, when the guides are adjusted to angularly dispose their arcs relative to each other and to the lead-in and lead-out rollers respectively, this adjustment remains fixed relative to each other and to the lead-in and lead-out rollers, respectively, due to the connections of and the unitary movement of the frame means supporting both guides.

BRIEF DESCRIPTION OF THE DRAWINGS

FIGS. 4 and 5 are cross-sectional views similar to FIG. 3 but showing modifications of the invention.

DETAILED DESCRIPTION OF THE INVENTION

Figure 1:
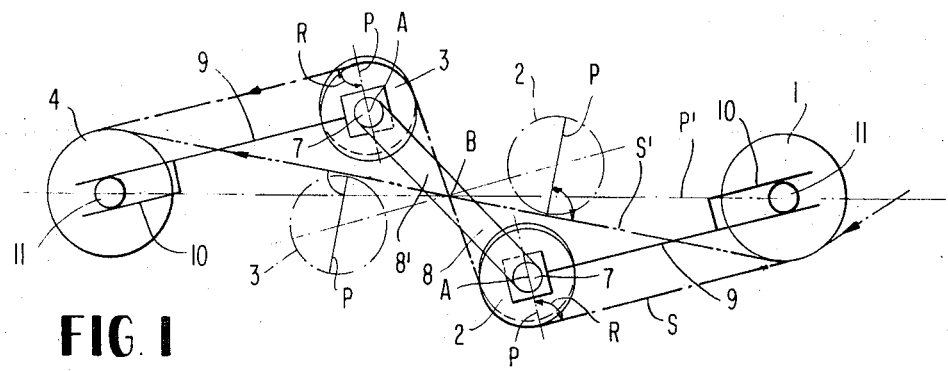
FIG. 1 is a diagrammatic side view in elevation illustrating one embodiment of the concept of the invention.

Referring now to the drawings, specifically to FIG. 1, a strip separating and spacing apparatus comprises a lead-in roller 1, a first arcuate guide 2, a second arcuate guide 3, and a lead-out roller 4. The strips S which have been slit from a relatively wide web, pass from the slitter under the lead-in roller 1 and the lead-in guide 2 and from the guide 2 over the lead-out guide 3 to the lead-out roller 4, travelling through an S-shaped path. The guides 2 and 3 are arcuate transversely of the path of the strips S so that as the strips pass around the guide 2, they are twisted slightly from their side-by-side coplanar relationship to an angularly deviated relationship and in which their planes no longer are coplanar. These twisted and angularly deviated strips are received by the arcuate guide 3 which twists them back into coplanar but spaced relation as the strips pass to the lead-out roller 4.

The angle of the arcs, that is, the planes P bisecting the points of maximum curvature, of the guides 2 and 3 must be adjusted about their axes A so that their arcs are in predetermined relationship relative to each other to properly deflect and twist the planes of the strips and the angles of the arcs also must be maintained in fixed relationship relative to the respective lead-in and lead-out rollers 1 and 4. That is, the angle of the guide 2 must be maintained relative to the lead-in roller 1, and the angle of the guide 3 must be maintained relative to the lead-out roller 4. The degree to which the strips are deviated and thereby spaced from each other depends upon the angular location of the guides 2 and 3 relative to an intermediate axis B therebetween, and the disposition of the guides may range from a maximum wherein the path of the strips S extends through substantially right angles as between the guides and the lead-in and lead-out rollers, and as between the guides per se, as shown in full lines in FIG. 1, to positions in which the guides barely are engaged by the strips as indicated by the strip path S' and the guides shown in phantom lines.

According to the present invention, the lead-in and lead-out rollers 1 and 4 are rotatably supported by shafts 11 whose axes lie in a plane P' that is common to the axis B and the guides 2 and 3 are pivotally supported by shafts 7 whose axes A are in another plane also common with the axis B, the shafts 7 being pivotally supported by arms 8, 8' which are mounted for common pivotal movement about the axis B. To maintain the angle of the arcs of the guides 2 and 3, that is, their planes P, relative to the respective rollers 1 and 4, the guide 2 has a lever 9 affixed to its shaft 7 and which has a slotted yoke 10 in its free end in straddling position relative to the shaft 11 of the roller 1. Similarly, the guide 3 has a corresponding lever 9 fixed to its shaft 7 and having a yoke or fork 10 at its free end and straddling the shaft 11 of the roller 4.

The angle of the plane P of the guide 2 is adjusted so that the plane is disposed at a right angle R relative to the incoming strips S and the plane P of the guide 3 is similarly adjusted so that the angle between said plane and the outgoing strips from guide 3 to the roller 4 also is a right angle R. In these positions of adjustment, the planes P are parallel to each other. This angular relationship between the strips and the planes P are maintained regardless of the angular disposition of the guides 2 and 3 relative to the axis B as illustrated by the phantom line illustrations of the guides 2 and 3 and their planes P relative to the strip path S', this constancy being due to the fixed levers 9 and their relationship with the shafts 11 regardless of the angular disposition of the guides 2 and 3 due to swinging movement of their supporting arms 8, 8' about the axis B.

Thus, in the full line position shown in FIG. 1, the strips approach the guide 2 at its point of maximum concavity and leave the guide 3 at the point of its maximum convexity, so that the path through which the strips pass is substantially 90° around each of the guides which produces the maximum degree of spacing of the strips. If the spacing is to be less than maximum, then pivotal movement of the arms 8, 8' will swing the guides 2 and 3 toward the phantom line positions to progressively decrease the degree of concavity and convexity at which the strips approach and depart the guides 2 and 3 and thereby reduce the spacing between the realigned coplanar strips departing the guide 3 and approaching the lead-out roller 4. The fixed relation between guides 2 and 3 due to fixed relation of the arms 8, 8' and the fixed relation of the guides 2 and 3 respectively with the rollers 1 and 4 due to the levers 9 maintains ideal conditions in every position so that the only variation is the amount of spacing between these particular strips.

Figure 2:
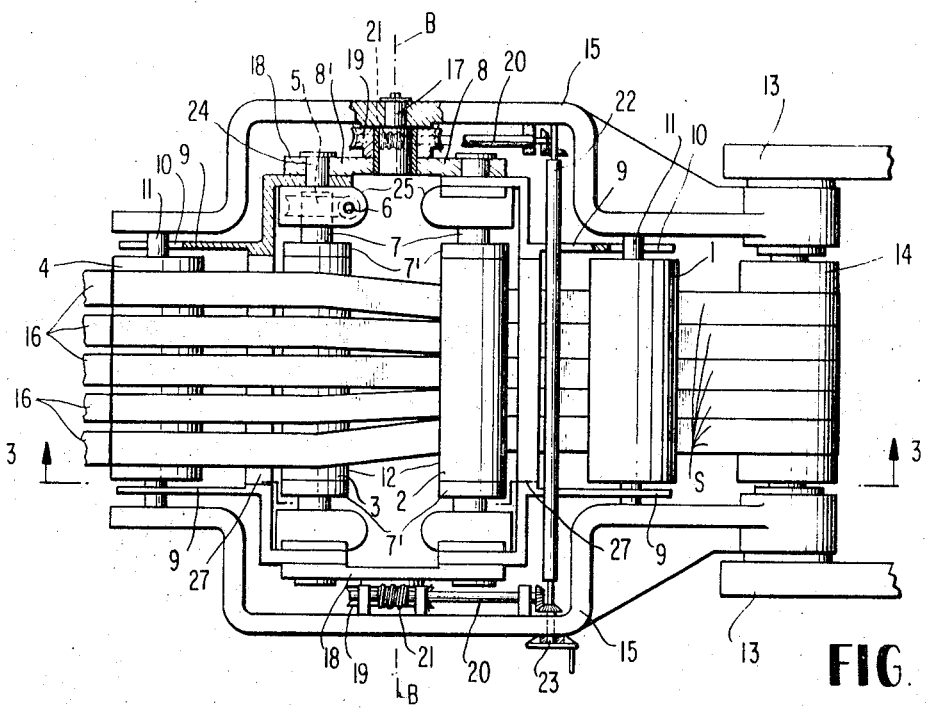
FIG. 2 is a plan view of the apparatus diagrammatically illustrated in FIG. 1.
Figure 3:
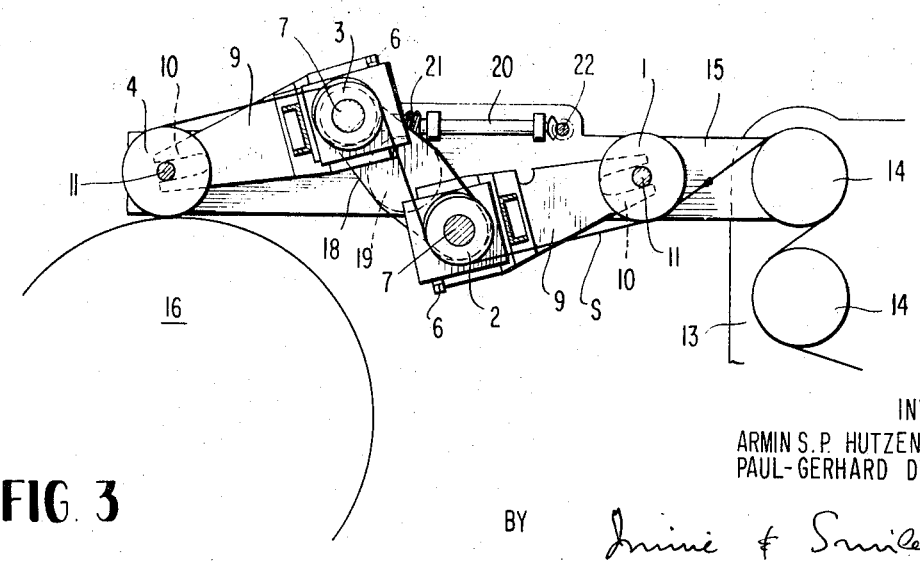
FIG. 3 is a cross-sectional view taken on line 3—3 of FIG. 2.

Referring now to FIGS. 2 and 3, a structural embodiment of the invention corresponding to the arrangement described with respect to FIG. 1 is shown as comprising two side frame members 15 that are pivotally mounted on or coaxial with the shaft of the lead-out rollers 14 of a strip handling apparatus 13, such as a slitter. The side frame members 15 support the shafts 11 of the rollers 1 and 4 which thereby form a unitary frame pivotally supported on the associated apparatus 13 to enable the lead-out roller 4 to bear upon and follow the diameter of, for example, a rewind roll or rather a plurality of rewind rolls 16. The arms 8, 8' in the present embodiment constitute diammetrically opposite extensions of cross frames 18 that are centrally supported pivotally by shafts 17 disposed on the axis B. The cross frames 18 constitute a turret support for the guides.

Fixed with the frames 18 and the shafts 17 are worm gears 19 engaged by worms 21 fixed with shafts 20, which may be rotated simultaneously through bevel gear connections with a cross shaft 22 that may be operated by a crank 23 at one side of the apparatus. The shafts 7 of the guides 2 and 3 are mounted in bearing blocks 25, at least one of which for each guide encloses worm gearing 5, the worm of which has an exposed end 6 with a tool engaging portion to enable adjustment of the angulation of the shaft 7, and the bearing blocks are mounted in the cross frames 18 by pivots 24. The bearing blocks 25 are fixed to the levers 9 so that the angle of the guides will correspond to their respective rollers 1 and 4 regardless of the relative pivotal movement of the guides on their supporting pin 24 due to rotational movement of the cross frames 18.

The modification shown in FIG. 4 is similar to that shown and described with respect to FIG. 3, except that the bearing blocks 25 for the guides 2 and 3 are fixed to levers 28, instead of levers 9, and the free ends of the levers are connected by pivots 28' with the ends of a connecting rod or bar 29 and one of the pivots 28' carries a cam follower roller 30 which is disposed within an arcuate cam slot 31 in an arm 31' on one of the side frames 15'. The shape of the slot 31 may be established empirically and is such that the angular setting of the guides 2 and 3 relative to each other and the rollers 1 and 4 is maintained regardless of the angle of the cross frames 18 so that the angulation and deviation of the strips S will be maintained as previously described.

A further modification is shown in FIG. 5 wherein guide supporting arms 8a and 8'a are independent of each other and are pivotally mounted on the shafts 11 of the lead-in and lead-out rollers 1 and 4, respectively. A worm gear 34 is fixedly with the arm 8a and meshes with a worm 35 carried by the side frame arm 15" and driven by a cross shaft 36. The arm 8a has an arm 32 extending angularly therefrom whereas the arm 8a' has a similar but oppositely disposed arm 32' extending therefrom and the arms 32 and 32' are connected by pivots 33' at their free ends with a connecting bar or rod 33. Thus, adjustment of the cross shaft 36, similar to the adjustment of the cross shaft 22, adjusts the angle of the arm 8a and through the arm 32 and connecting bar 33 adjusts the arm 32' of the arm 8a'. As a result, the angle R between the lead-in and lead-out planes of the tapes or strips and the planes P of the guids is maintained.

Although the guides 2 and 3 are shown in FIG. 2 as comprising bowed rollers including sleeves 12 surrounding the shafts 7 and fitted between end members 7' fixed on the shafts, it will be understood that the present invention applies equally as well as to guides of the rigid bar type. In all modifications, the angular adjustment of the guides 2 and 3 is maintained constant relative to each other and to the lead-in and lead-out rollers 1 and 4, the adjustment of the guides being such that planes through their maximum arc are substantially at right angles of the paths of the strips as the latter engage the lead-in guide 2 and depart the lead-out guide 3. In all modifications, the angular adjustment of the guides 2 and 3 relative to the bearing blocks 25 is effected by means of the worm gearing 5 and operating member 6 and once this adjustment is established, then the relationship between the guides 2 and 3 and the rollers 1 and 4 is maintained.

According to the modification shown in FIGS. 2 and 3, the relationship is maintained by the turret support and the levers 9, whereas in FIG. 4 this relationship is maintained by means of the arms 28, connecting link 29 and cam follower and cam 30 and 31, the cam slot 31 being so designed as to maintain the proper relationship regardless of the angular disposition of the turret 18. The modification of FIG. 5 is such that the relationship between the guide supporting arms 8a, 8a' is maintained by means of the angularly disposed arms 32, 32' and the connecting link 33 so as to obtain the same effect. According to this modification, the arms 8a, 8a' perform the combined function of the turret 18 and the levers 9 or the levers 28, and associated linkage and cam control. Consequently, in this instance, the bearing blocks are fixed relative to the arms 8a, 8a' and are not rotatable relative to such supporting arms as they are in the modifications of FIGS. 3 and 4.

We claim:

1. Strip spacing apparatus comprising a frame, a lead-in roller for receiving a plurality of parallel, side-by-side strips that have been slit from a relatively wide web, a shaft carried by said frame and rotatably supporting said roller, a lead-in guide for receiving the strips from the lead-in roller, a lead-out guide for receiving the strips from the lead-in guide, a lead-out roller for receiving the strips from the lead-out guide, a shaft carried by said frame and rotatably supporting said lead-out roller, said guides being arcuate longitudinally of their axes and transverse to the path of said strips and disposed on either side thereof, the guides being so located such that planes bisecting their curvature are in a predetermined relation to each other and disposed at selected angles to the paths of the strips as they approach and depart the respective guides, whereby the strips are turned and deflected apart by the lead-in guide and are turned back in parallel but spaced relation by the lead-out guide, means supporting said guides for adjustable movement to various web contacting positions, and means for maintaining said guides in said predetermined relation and at said selected angles relative to said paths during said adjustable movement of said guides.

2. Apparatus according to claim 1, wherein said supporting means comprises a turret pivotally supported by said frame and pivotally supporting said guides, and wherein said maintaining means include means connecting saidguides with said frame to maintain the angular relation of said guides regardless of the position of said turret.

3. Apparatus according to claim 2, wherein said means connecting said guides with said frame comprises levers fixed with said guides and having slots straddling said roller shafts respectively.

4. Apparatus according to claim 2, wherein said means connecting said guides with said frame comprises levers fixed with said guides, cam means on said frame, and cam follower means cooperative with said cam means and connected with said levers.

5. Apparatus according to claim 4, wherein said cam follower means comprises a link connected between said levers and a cam follower connected with said link.

6. Apparatus according to claim 1, wherein said supporting means comprises arms pivotally mounted on said frame coaxially with said rollers, said guides being fixedly mounted on said arms, and means connecting said arms for simultaneous and equal pivotal movement.

7. Apparatus according to claim 1, wherein said frame has means at the end adjacent said lead-in roller for pivotal mounting on an associated strip handling apparatus so that said lead-out roller can function as a pressure roller on rewound rolls.

8. Apparatus according to claim 1, wherein said planes are disposed substantially at right angles to the paths of the strips.

9. Apparatus according to claim 1, wherein said planes are disposed in parallel relationship.

10. Apparatus according to claim 9, wherein said planes are disposed substantially at right angles to the paths of the strips.

* * * * *